Sept. 3, 1963  C. H. ZWEIFEL  3,102,642
LIST COMPENSATING DEVICE
Filed March 20, 1961  2 Sheets-Sheet 1
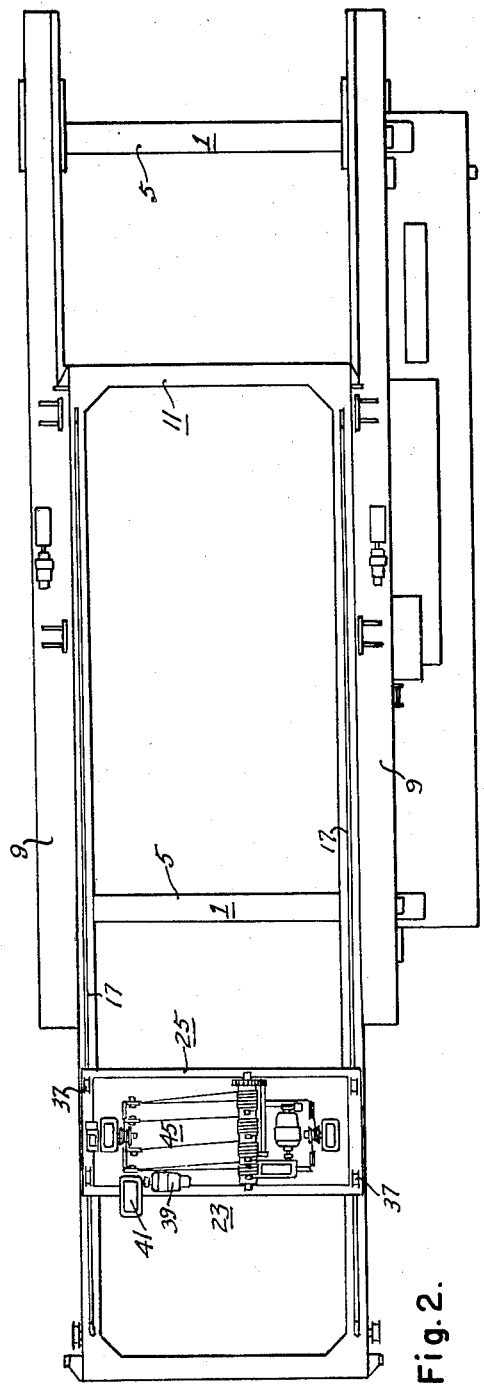
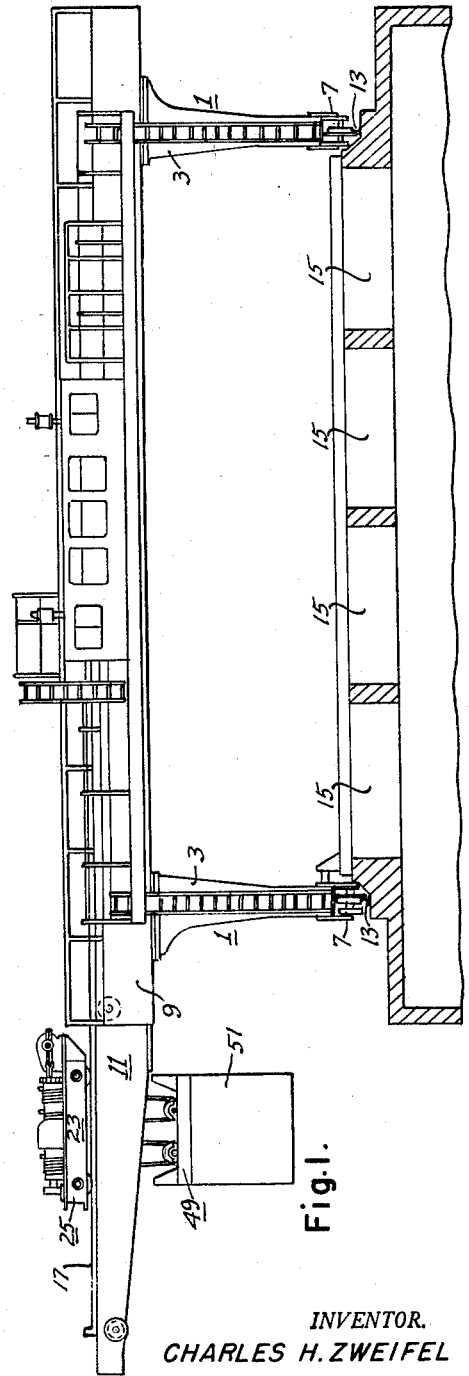
INVENTOR.
CHARLES H. ZWEIFEL
BY
Bruce & Brosler
HIS ATTORNEYS Sept. 3, 1963  C. H. ZWEIFEL  3,102,642
LIST COMPENSATING DEVICE
Filed March 20, 1961  2 Sheets-Sheet 2
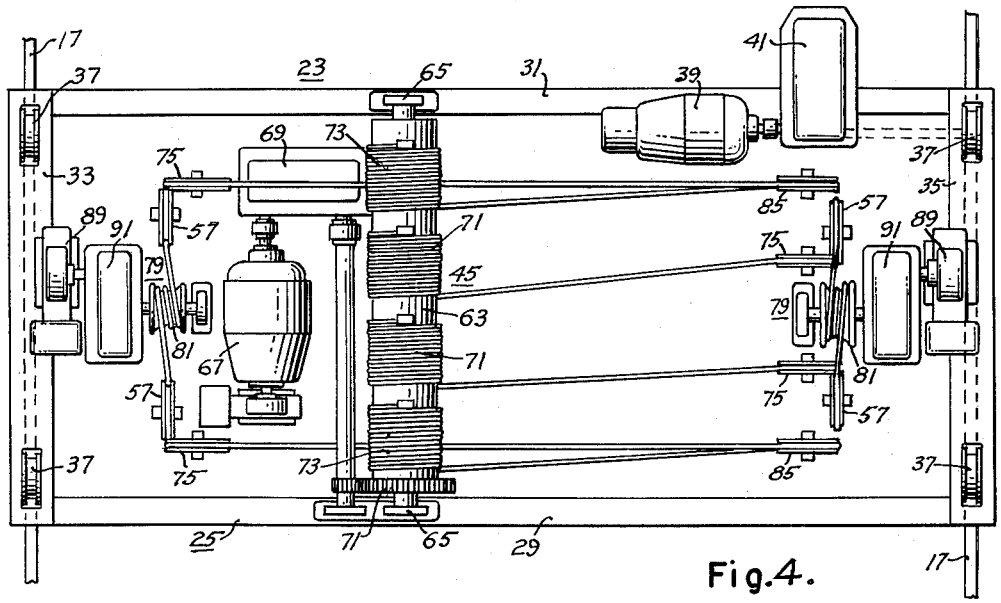
Fig.4.
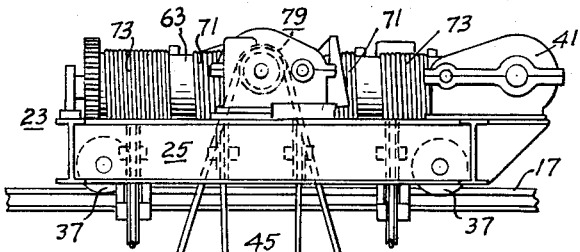
Fig.3.
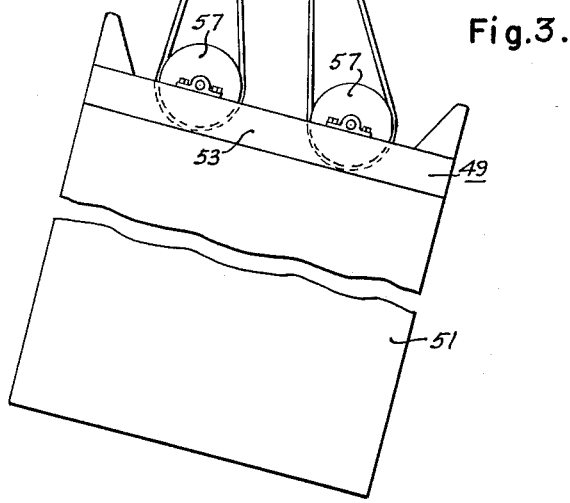
INVENTOR.
CHARLES H. ZWEIFEL
BY
Bruce & Brosler
HIS ATTORNEYS

United States Patent Office 3,102,642
Patented Sept. 3, 1963

3,102,642
LIST COMPENSATING DEVICE
Charles H. Zweifel, Oakland, Calif., assignor to Pacific Coast Engineering Company, a corporation of California
Filed Mar. 20, 1961, Ser. No. 97,029
6 Claims. (Cl. 212—15)

My invention relates to the handling of freight between ship and shore and more particularly to a ship installed gantry type crane assembly for the loading and unloading of a ship, and more particularly ships adapted to handle cargo containers.

Present day trend in the rapid handling of freight involves the use of freight or cargo containers of standardized sizes which may be of an order of 8 feet by 8 feet at each end and 17 feet and longer in length. These cargo containers are packed with freight, being large enough to permit ingress and egress of a forklift, and when packed, constitute units of standardized size, which may be handled and stacked in a uniform manner either on deck or in the hold of a ship.

Ships adapted to carry freight in this manner, will provide a plurality of series of deck hatches, each of a size to conveniently permit of the passage of a cargo container into and from the hold of the ship.

While a dock or truck bed from which cargo might be hoisted and transferred to a ship, or to which a cargo container might be transferred from a ship, will usually be level and remain so, the same cannot be said of the deck or hold of a ship, due to listing of the ship in response to unbalance of ship loading with respect to the longitudinal axis thereof, such unbalancing continually changing with loading or unloading of the ship and other factors. Consequently, in the transfer of a cargo container in either direction between the ship and shore, the problem arises of handling such containers to facilitate the loading and unloading of the same in either direction for it involves the transfer of such container between a horizontal surface and a surface at a list angle which is apt to change from time to time.

Among the objects of my invention are:

(1) To provide a novel and improved gantry type crane assembly which can maintain a load at any prevailing list angle of a ship on which such crane may be installed;

(2) To provide a novel and improved gantry type crane assembly adapted to level a load under control of an operator, from a list angle at which such load may be suspended from such crane;

(3) To provide a novel and improved gantry type crane assembly adapted under control of an operator, to convert the attitude of horizontal or level load to the prevailing list angle of the ship on which such crane may be mounted.

Additional objects of my invention will be brought out in the following description of a preferred embodiment of the same, taken in conjunction with the accompanying drawings, wherein:

FIG. 1 is a view in elevation of a deck mounted gantry type crane assembly incorporating the present invention;

FIG. 2 is a plan view of the gantry type crane assembly of FIG. 1;

FIG. 3 is an end view in elevation of the hoist mechanism involved in the present invention; and FIG. 4 is a plan view of the hoist mechanism of FIG. 3.

Referring to the drawings, the construction of the crane per se may be of any conventional type installed transversely of the deck of a ship and adapted for adjustment to extend its reach either to starboard or to port side for the movement of freight between the ship and a dock and other location to either side of the ship.

For purposes of illustration, the specific crane construction depicted in the drawings, involves a pair of U-shaped end frames 1, each including a pair of upright legs 3 transversely connected adjacent their lower ends by a cross member 5 and supported on a pair of wheeled trucks 7.

The corresponding legs of the end frames are tied together by a flanged girder 9 to provide parallel supports on which to slidably move a boom in the form of a frame 11 adapted to be moved between an extended position on the starboard side to an extended position on the port side, depending from which side cargo is being handled.

For such purpose, the crane is disposed transversely of the ship's deck, and riding on a pair of rails 13 whereby the crane may be moved from a position over one transverse series of deck hatches 15 to a position over any of a plurality of such series of deck hatches. When not adjusted for the handling of freight between ship and shore, or otherwise, the boom frame 11 will be retracted to a central symmetrical position and stored in such position.

The boom frame is provided with rails 17 on which to support and drive a hoist mechanism 23 under control of an operator. Such hoist mechanism involves a trolley 25 fabricated in the form of a frame having parallel spaced cross members 29, 31 connected by end members 33, 35 in which are mounted wheels 37 for riding the rails 17. Such wheels may be drive connected in any suitable manner to a drive motor 39 and gear reducer 41 mounted on the trolley frame.

The essence of the present invention resides in the combination with gantry type crane of the general type described, of a specific type reeving system 45 carried by the trolley 25 as part of the hoist mechanism.

Such reeving system may comprise a frame 49 of a length and width approximating that of a cargo container 51 as a load to be handled thereby, said frame incorporating any suitable means, not specifically illustrated, for removably attaching the frame to such a cargo container. Opposite end members 53 of the frame 49, each carries a pair of spaced sheaves 57 as elements of the reeving system, which for the most part is mounted on the trolley 25 as part of the hoist mechanism.

Such reeving system includes a lift drum 63 spanning the trolley frame and journalled in bearings 65 carried by the pair of cross members 29, 31 of said frame. This lift drum is driven by a motor 67 through a suitable speed reducer 69 and gear train 71.

On the hoist drum are two parts of cable windings 71 and 73, each pair being associated with the cargo container supporting frame sheaves 57 at each end of the container supporting frame 49. Each such cable winding at one end is anchored to the hoist drum, while its other end is passed over a guide sheave 75 down under its associated frame sheave 57 and effectively anchored to a load attitude compensating means 79.

In the specific embodiment of the invention illustrated, such load attitude compensating means comprises a drum 81 about which the cable of each winding of a pair is wrapped one or more turns and anchored to the drum, though for practical purposes, in the invention as illustrated, both cable windings of a pair may comprise but a single cable, the only requirement at this point being that the list compensating device permit sufficient take up and let out of cable to enable the load supporting frame to level itself. The pair of sheaves at each end of such frame may be similarly coupled to the hoist drum.

It may be desirable, however, to congregate the hoist drum and drive motor toward one end of the trolley, and under these conditions, to avoid too large an approach angle between the cable and the guide sheaves closest to the hoist drum, the cables which pass over such guide sheaves may each first be fed over an idler sheave 85 at the opposite end of the trolley.

With the list compensating or attitude controlling drum running free, it will be appreciated that the container carrying frame 49 and its load will normally tend to assume a horizontal position, regardless of the list angle of the trolley, which will correspond to that of the gantry crane, which in turn will correspond to the prevailing list angle of the ship. Such condition, while it may be favorable for the raising or lowering of a cargo container load with respect to a level plane such as a dock or truck bed, would not be suitable nor convenient for raising or lowering a cargo container into or out of a hold of a ship, which may have assumed a list angle.

To convert the horizontal attitude of such a load to the attitude or list angle of the ship, the load is raised until the cargo container supporting frame 49 is elevated into full contact with the frame of the trolley, whereby it is compelled to assume the prevailing list angle of the ship, and then moved to the location where it is to be lowered.

This in itself, however, is not sufficient to enable one to lower the load thereafter at the prevailing list angle, for immediately upon releasing the load from its engagement with the trolley, it will, in the absence of other factors, again assume its previous horizontal attitude.

Accordingly, to prevent this and force the load to maintain the list angle of the ship during subsequent lowering of the load, I have found that this can be accomplished by immobilizing both list compensating or attitude controlling drums. This can be accomplished by providing suitable braking mechanism, such as an electrically operated brake 89 functioning through a brake speed increaser 91 and which can be energized when the load has been drawn up into engagement with the trolley frame. Thereafter, upon lowering the load, the immobilized list compensating drums will provide fixed anchorage for the load supporting cables, and a load under these conditions cannot help but maintain the list angle of the ship as it is lowered into the hold of such ship.

Likewise, in raising a cargo container from the hold of a ship, with the attitude controlling drums locked, the cargo container will maintain the list angle of the ship. When it is subsequently desired to lower the load to a dock or other horizontal surface, the attitude controlling drums are released, whereupon the cargo container load will automatically level itself when lowered, thus adjusting its attitude to meet the prevailing conditions. In lieu of the described list compensating drums, any type of mechanism may be installed at this point which will permit of the necessary free movement of the anchored ends of the load supporting cables to permit self-leveling of the load, but which may be locked, when it is desirable to freeze the load at any desired list angle.

Accordingly, while I have illustrated and described my invention in its preferred form, it will be apparent that the same is subject to alteration and modification without departing from the underlying principles involved, and I accordingly do not desire to be limited in my protection to the specific details thus illustrated and described, except as may be necessitated by the appended claims.

I claim:

1. Cargo container lift assembly for a shipboard gantry type crane having a pair of parallel girders and a trolley mounted on said girders for travel therealong; said cargo container lift assembly comprising a load frame assembly for supporting a cargo container to be lifted; means operated from said trolley for vertically elevating and lowering said load frame assembly in a horizontal attitude regardless of the list angle of said crane, said means including spaced sheaves in said load frame assembly, load attitude compensating means on said trolley, a load supporting cable extending downwardly from said trolley to and around each of said sheaves and up to said load attitude compensating means, said load attitude compensating means being adapted to permit sufficient take up and let out of cable to enable the load supporting frame to level itself; and means for selectively retaining said load frame assembly at any established list angle thereof while vertically elevating and lowering the same, said last means including means for immobilizing said load attitude compensating means against permitting such take up and let out of cable following establishment of such a list angle.

2. Cargo container lift assembly for a shipboard gantry type crane having a pair of parallel girders and a trolley mounted on said girders for travel therealong, said cargo container lift assembly comprising a load frame assembly for supporting a cargo container to be lifted; means operated from said trolley for elevating and lowering said load frame assembly in a horizontal attitude regardless of the list angle of said crane, said means including a pair of load sheaves affixed to said load frame assembly, list compensating means carried by said trolley, hoist means on said trolley, a cable running from said hoist means under each load sheave and to the associated list compensating means, said list compensating means being movable sufficiently to permit said load frame assembly to level itself to a horizontal attitude, and means for driving said hoist means to simultaneous wind or unwind said cables to effect such lifting and lowering of said load frame in a horizontal attitude; and means for retaining said load frame assembly at any established list angle thereof, said means including means for locking said list compensating means against movement.

3. Cargo container lift assembly for a shipboard gantry type crane having a pair of parallel girders and a trolley mounted on said girders for travel therealong, said cargo container lift assembly comprising a load frame assembly for supporting a cargo container to be lifted; means operated from said trolley for elevating and lowering said load frame assembly in a horizontal attitude regardless of the list angle of said crane, said means including a pair of load sheaves affixed to said load frame assembly, list compensating means carried by said trolley and including a list compensating normally rotatable drum on said trolley above and between said load sheaves, hoist cable storage means on said trolley, a cable running from said hoist cable storage means under each load sheave and sufficiently about the said list compensating drum to permit said frame assembly to level itself to a horizontal attitude, and means for driving said hoist cable storage means to simultaneously take up or let out said cables to effect such lifting and lowering of said load frame assembly in a horizontal attitude; and means for retaining said load frame assembly at any established list angle thereof, said means including means for locking said list compensating drum against rotation.

4. Cargo container lift assembly for a shipboard gantry type crane having a pair of parallel girders and a trolley mounted on said girders for travel therealong, said cargo container lift assembly comprising a load frame assembly for supporting a cargo container to be lifted; means on said load frame for removably attaching said frame assembly to a cargo container; means operated from said trolley for elevating and lowering said load frame assembly in a horizontal attitude regardless of the list angle of said crane, said means including two pairs of load sheaves on said load frame assembly, said pairs being spaced from each other, list compensating means carried by said trolley and including a list compensating device on said trolley above and between the load sheaves of each of said pairs of load sheaves, hoist cable storage means on said trolley, a cable running from said hoist cable storage means under each load sheave and to the associated list compensating device, said list compensating device being normally freely movable sufficiently to permit self-levelling of a load frame assembly suspended by said cables, and means for driving said hoist cable storage means to simultaneously take up or let out said cables to effect such lifting and lowering of said load frame assembly in a horizontal attitude; and means for retaining said load frame assembly at any established list angle thereof, said means including means for precluding movement of said list compensating devices.

5. Cargo container lift assembly for a shipboard gantry type crane having a pair of parallel girders and a trolley mounted on said girders for travel therealong; said cargo container lift assembly comprising a load frame assembly including means for removably attaching said frame assembly to a cargo container; means operated from said trolley for elevating and lowering said load frame assembly in a horizontal attitude regardless of the list angle of said crane, said means including two pairs of load sheaves on said load frame assembly, said pairs being spaced from each other, list compensating means carried by said trolley and including a list compensating drum on said trolley above and between the load sheaves of each of said pairs of load sheaves, hoist drum means on said trolley, a cable running from said hoist drum means under each load sheave and to the associated list compensating drum, each of said list compensating drums being normally freely rotatable sufficiently to permit self-leveling of said load frame assembly to a horizontal attitude, and means for driving said hoist drum means to simultaneously wind or unwind said cables to effect such lifting and lowering of said load frame assembly while said load frame assembly maintains itself in a horizontal attitude; and means for retaining said load frame assembly at any established list angle thereof, said means including means for precluding movement of any of said cables about its associated list compensating drum.

6. Cargo container lift assembly for a shipboard gantry type crane having a pair of parallel girders and a trolley mounted on said girders for travel therealong; said cargo container lift assembly comprising a load frame assembly including means for removably attaching said frame assembly to a cargo container; means operated from said trolley for elevating and lowering said load frame assembly in a horizontal attitude regardless of the list angle of said crane, said means including a pair of load sheaves affixed to said load frame assembly toward an end thereof, a second pair of load sheaves affixed to said load frame assembly toward the opposite end thereof, list compensating means carried by said trolley and including a list compensating drum on said trolley above and between the load sheaves of each of said pairs of load sheaves, hoist drum means on said trolley, a cable running from said hoist drum means under each load sheave and to associated list compensating drum, each of said list compensating drums being normally freely rotatable sufficiently to permit self-leveling of said load frame assembly to a horizontal attitude, and means for driving said hoist drum means to simultaneouly wind or unwind said cables to effect such lifting and lowering of said load frame assembly while said load frame assembly maintains itself in a horizontal attitude; and means for retaining said load frame assembly at any established list angle thereof, said means including means for precluding movement of any of said cables about its associated list compensating drum.

References Cited in the file of this patent
UNITED STATES PATENTS

| | | |
|---|---|---|
| 2,555,297 | Smith et al. | May 29, 1951 |
| 2,707,053 | Browning | Apr. 26, 1955 |
| 3,042,227 | Tantlinger | July 3, 1962 |